United States Patent
Watanabe et al.

(10) Patent No.: US 7,002,116 B2
(45) Date of Patent: Feb. 21, 2006

(54) BAKING METHOD

(75) Inventors: Michihiko Watanabe, Osaka (JP);
Yoshihisa Takahashi, Tokyo (JP);
Terumitsu Aiba, Tokyo (JP);
Kimiyoshi Matsuo, Tokyo (JP);
Shoichi Honjo, Tokyo (JP); Tomoo Mimura, Tokyo (JP)

(73) Assignees: Sumitomo Electric Industries, Ltd., Tokyo (JP); The Tokyo Electric Power Company, Incorporated, Tokyo (JP)

( * ) Notice: Subject to any disclaimer, the term of this patent is extended or adjusted under 35 U.S.C. 154(b) by 52 days.

(21) Appl. No.: 10/852,163

(22) Filed: May 25, 2004

(65) Prior Publication Data
US 2004/0238528 A1 Dec. 2, 2004

(30) Foreign Application Priority Data
May 26, 2003 (JP) .............................. 2003-148420

(51) Int. Cl.
*H05B 3/42* (2006.01)
*F16L 59/065* (2006.01)

(52) U.S. Cl. .................... 219/552; 219/553; 219/390; 219/409; 219/538

(58) Field of Classification Search ................. 373/118
See application file for complete search history.

(56) References Cited

U.S. PATENT DOCUMENTS 4,490,828 A * 12/1984 Fukuhara et al. ........... 373/117

FOREIGN PATENT DOCUMENTS

| JP | 09-273659 | 10/1997 |
|----|-----------|---------|
| JP | 09-296779 | 11/1997 |
| JP | 11-125609 | 5/1999  |

* cited by examiner

*Primary Examiner*—Joseph Pelham
(74) *Attorney, Agent, or Firm*—Foley & Lardner LLP

(57) ABSTRACT

A baking method for heating an object (an inner pipe, an outer pipe) having a vacuum layer formed therein to remove gas molecules occluded in the object, wherein the object itself is made to be a heat production element for heating. By making the baking object a heat production element, the object can be heated directly and the heating can be energy-efficient. Moreover, additional heating means such as a heater or gas is unnecessary, which enables simplification of a configuration of a baking device. Therefore, a baking method is obtained which enables energy-efficient heating and, in particular, uniform heating of a long or large object.

5 Claims, 2 Drawing Sheets

BAKING METHOD

BACKGROUND OF THE INVENTION

1. Field of the Invention

The present invention relates to a baking method for heating an object to remove gas molecules occluded in the object. More specifically, the present invention relates to a baking method most suitable for baking a superconducting cable, various pipes such as a cold water pipe, a feed water pipe, an LNG pipe, a refrigerant pipe, a hot water pipe, a hot water supply line, and a heating medium pipe, pipe fittings, and a heat insulation pipe or a heat insulation vessel used as a piping instrument.

2. Description of the Background Art

For production of a vacuum double heat insulation pipe having a vacuum layer formed between an inner pipe and an outer pipe, for example, heat processing called baking to heat the heat insulation pipe is performed to remove gas molecules occluded in a material of the heat insulation pipe to enhance a degree of vacuum. For the baking, roughly two methods are known. One method is heating an object by arranging heating means such as a heater near the heat insulation pipe (for example, see Japanese Patent Laying-Open No. 9-296779 and No. 11-125609). The other method is introducing heated gas into the vacuum layer of the heat insulation pipe and then exhausting the gas (for example, see Japanese Patent Laying-Open No. 9-273659).

The above-mentioned conventional methods, however, cause problems as follows.

<Method of Using Heating Means Such as a Heater>

(1) Energy is highly lost from the heating means.

With a heater, a baking object is heated from the outside of the vacuum layer mainly with conductive heat from the heater. Thus, a member of the baking object which faces the vacuum layer cannot be heated directly, and energy is highly lost from a heat source. Though the member facing the vacuum layer can be heated more efficiently by arranging the heater inside the vacuum layer, it is not practical because the heater and a wiring thereof release gas that decreases a degree of vacuum and, in addition, it complicates the configuration to remove the wiring from the vacuum layer to an atmospheric side.

(2) A baking device becomes so large and complicated that a space for setting the device is limited.

A baking device becomes larger by installation of the heater, which limits a place for setting. In addition, the larger the surface area of the member facing the vacuum layer is, the larger the heater and a power supply thereof become, and the wiring of the heater will also be complicated. In particular, it is not easy to wind the heater around whole length of a long body as a heat insulation pipe. On the other hand, without upsizing the heating means such as a heater, a size of the baking object that can be heated is then limited.

(3) Selection of elements for use in the baking device is limited because portions other than the baking object are also heated.

For portions of the baking device located near the heater are also heated, extra portions other than the baking object are also heated to high temperature (such as 70° C. or higher). Therefore, as prescribed heat resistance is also needed for the elements used in the heated portions, selection of the elements is limited.

(4) It is difficult to heat the whole baking object uniformly.

In the baking method using a heater, heat distribution becomes uneven and uniform baking effect is not achieved unless the heater is evenly mounted for the baking object. In particular, when the baking object is large or long in size and has a shape that has projections and depressions, it is hard to evenly mount the heater for the object.

<Method of Introducing Heated Gas into a Baking Object>

(1) A required amount of gas increases in proportion to a baking time.

Nitrogen gas or the like is used as the heated gas, and thus a cylinder to feed the gas and heating means for the gas are included in the baking device. For a longer baking time, the amount of gas needed increases, and thus a large cylinder is required which leads to upsizing of the device. In addition, as the object is indirectly heated with the heated gas, the heating is not energy-efficient.

(2) It is difficult to heat the whole baking object uniformly.

The heated gas is usually introduced from one end side of the heat insulation pipe and exhausted from the other end side. As temperatures of the heated gas are different at the inlet and outlet of the gas, it is difficult to uniformly heat the baking object. In particular, when the vacuum layer is large and long, the effect is conspicuous and the object is hardly baked to uniform temperature. In addition, because there is a necessity to increase a degree of vacuum (or decrease a pressure) in the vacuum layer of the vacuum heat insulation pipe (vessel), the heated gas cannot be fed again once evacuation is started after the heating of the object with introduced heated gas, even when a temperature in the vacuum layer decreases. Therefore, effect of the baking cannot be exerted efficiently.

SUMMARY OF THE INVENTION

Therefore, an object of the present invention is to provide a baking method which enables energy-efficient heating.

Another object of the present invention is to provide a baking method which enables uniform heating of a long or large object.

The present invention achieves the foregoing objects by making a baking object itself a heat production element.

That is, a baking method of the present invention is a baking method for heating an object having a vacuum layer formed therein to remove gas molecules occluded in the object, characterized in that the object itself is made to be a heat production element for heating.

By making a baking object itself a heat production element, the object can directly be heated, which enhances energy efficiency of heating. Furthermore, configuration of a baking device can be simplified as additional heating means such as a heater or gas is not required.

As one of specific means for making a baking object itself a heat production element, the object is energized to produce heat when the object is made of conductive metal. A vacuum double heat insulation pipe is generally formed with an inner pipe and an outer pipe made of metal, and is conductive. When the object as such is energized, the object itself can easily produce heat.

When the conductive object is formed with a plurality of members, it is preferred that the members are electrically insulated from each other and each member is separately energized. In many situations, the plurality of members are made of different materials or have different shapes or sizes, and may have values of resistance different from each other. When there is a large difference in values of resistance for the members, attained temperatures or times to reach to the attained temperatures may differ with the same amount of passed current, which results in uneven heating. Thus, when the baking object is formed with a plurality of members, separate energization for each member enables substantially uniform heat production as the whole object.

To energize the plurality of members separately, the members are electrically insulated from each other. . Means for the insulation is not limited. When the baking object is a vacuum double heat insulation pipe having inner and outer pipes, for example, the inner and outer pipes can be electrically insulated from each other with an insulation flange located between the pipes. The insulation flange is mounted so as to block opening ends of the inner and outer pipes, and a commercially available product can be utilized as the flange.

The baking method of the present invention can be applied to baking of a vacuum heat insulation structure. The method is most suitable for baking, for example, a superconducting cable, various pipes such as a cold water pipe, a feed water pipe, an LNG pipe, a refrigerant pipe, a hot water pipe, a hot water supply line, and a heating medium pipe, pipe fittings, and a heat insulation pipe or a heat insulation vessel used as a piping instrument.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described in the following.

(First Embodiment)

A baking method of the present invention is described, in which a baking object is a vacuum double heat insulation pipe for a superconducting cable.

Initially, a situation is described where inner and outer pipes forming the vacuum double heat insulation pipe are electrically connected.

Figure 1A:
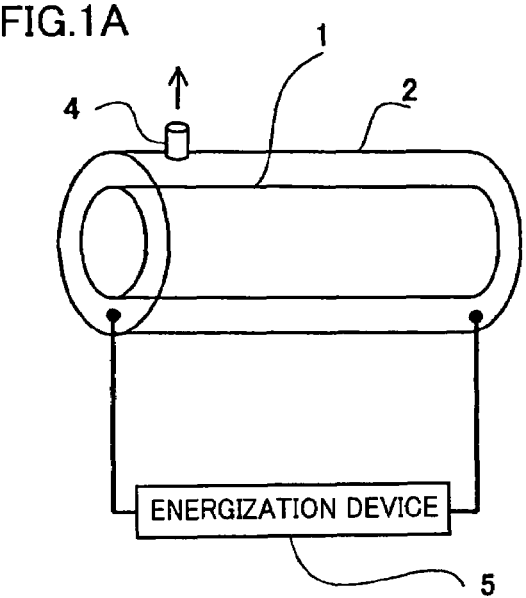
FIG. 1A is a diagram for describing a method of the present invention.
Figure 1B:
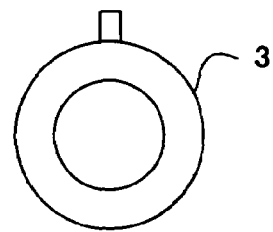
FIG. 1B is an end view of a heat insulation pipe, which is a baking object.

As shown in FIG. 1A, the heat insulation pipe has an inner pipe 1 and an outer pipe 2 arranged coaxially and spaced apart from each other. Though these inner and outer pipes 1, 2 may be straight tubes, corrugated metal pipes are used in this embodiment in consideration of bendability. As shown in FIG. 1B, opening ends of two pipes 1, 2 are sealed with an annular conductive flange 3 to bring pipes 1, 2 into conduction, and a vacuum layer is formed between inner and outer pipes 1, 2. In the vacuum layer, a radiant heat reflector (not shown) such as Super Insulation (trade name) is usually accommodated. The vacuum layer is formed by evacuation from an exhaust port 4 projectingly mounted on outer pipe 2. Electrodes are then mounted on both end portions of the heat insulation pipe, and an energization device 5 is connected via a lead.

Figure 1C:
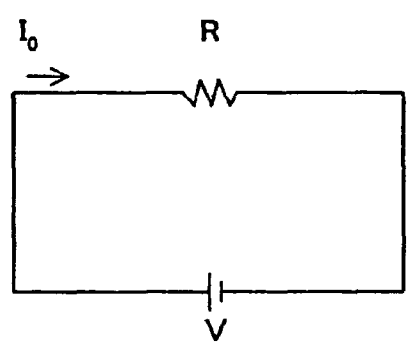
FIGS. 1C and 1D are equivalent circuit diagrams of a device used in the method of the present invention.

When a current is passed through the heat insulation pipe from energization device 5 in the baking device as shown, the inner and outer pipes themselves become heat production elements and are heated, which enables substantially uniform heating of the heat insulation pipe. FIG. 1C shows an equivalent circuit of the baking device. A calorific value per unit length of the heat insulation pipe can be expressed as $RI_0^2$ (W/m), where R ($\Omega$/m) represents resistance per unit length, V (V) represents a voltage of the energization device, and $I_0$ (A) represents a total current, and a calorific value of the whole length can be controlled uniformly by controlling current value $I_0$. Even when corrugated pipes are used as inner and outer pipes, as the bores and wall thicknesses thereof are substantially even throughout the whole length, the calorific value per unit length can be considered as substantially even. With the energization heating as such, wall surfaces of inner and outer pipes facing the vacuum layer can be heated concurrently and substantially uniformly. In particular, as conduction and convection of heat within the vacuum layer are substantially ignorable when an insulation layer has a high degree of vacuum, small amount of heat escapes from a surface of the inner pipe to the periphery when the inner pipe is heated, and a temperature of the inner pipe can be controlled economically with small amount of passed current.

Figure 1D:
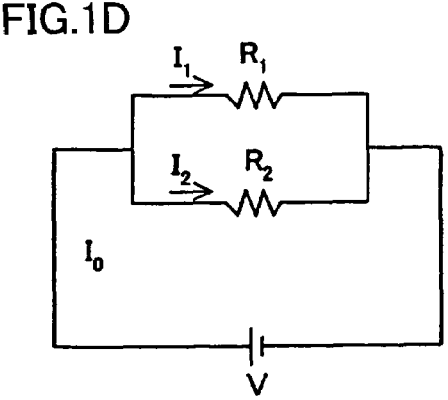

In actuality, as inner and outer pipes 1, 2 are brought into conduction with conductive flange 3 only at end portions, the circuit can be considered as a parallel circuit, as shown in FIG. 1D. Currents $I_1$ (A) and $I_2$ (A) that flow through pipes 1,2, respectively, are divided as follows:

$$I_1 = I_0 R_2/(R_1+R_2)$$

$$I_2 = I_0 R_1/(R_1+R_2)$$

where $R_1$ and $R_2$ represent electrical resistances per unit length of inner pipe 1 and outer pipe 2, respectively.

In addition, quantities of heat $W_1$ and $W_2$, respectively produced in inner pipe 1 and outer pipe 2 per unit length, are expressed as follows:

$$W_1 = R_1 I_1^2 = R_1 I_0^2 R_2^2/(R_1+R_2)^2 \quad (W/m)$$

$$W_2 = R_2 I_2^2 = R_2 I_0^2 R_1^2/(R_1+R_2)^2 \quad (W/m)$$

Therefore, there will be a large difference in calorific values when the inner and outer pipes have extremely different values of resistance, and distribution of the baking temperature may become uneven. Furthermore, as the structure is such that the inner pipe is covered with the outer pipe, heat tend to accumulate on the inner pipe side. Thus, there is a high possibility that the inner pipe attains higher temperature or has a shorter temperature rise time to the attained temperature, even when it has the same calorific value as the outer pipe. As a result, with the baking method of this embodiment, there is a general tendency to become $T_1 > T_2$, where $T_1$ and $T_2$ represent attained temperatures of inner and outer pipes, respectively. Therefore, it is desirable to select an appropriate value for a baking setting temperature $T_S$ to satisfy a relational expression $T_1 \leq T_S \leq T_2$. It is certainly possible to optimize a baking condition to enable uniform heating by adjusting combinations of dimensions (cross-sectional area, thickness) or materials of the inner and outer pipes.

(Second Embodiment)

An embodiment is described, in which inner and outer pipes forming the vacuum double heat insulation pipe are electrically insulated from each other.

As described in the first embodiment, heating of inner and outer pipes may become uneven when the inner and outer pipes have significantly different values of resistance. In this embodiment, inner pipe 1 and outer pipe 2 are insulated from each other and each of pipes 1, 2 is independently energized to enable uniform heating.

Figure 2A:
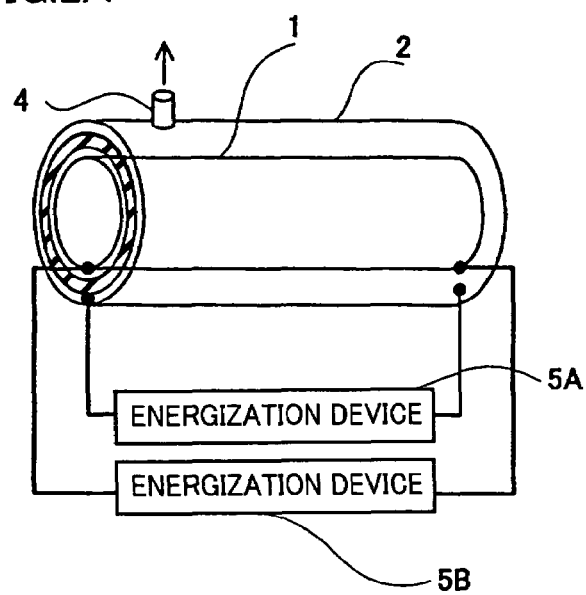
FIG. 2A is a diagram for describing a method of the present invention.
Figure 2B:
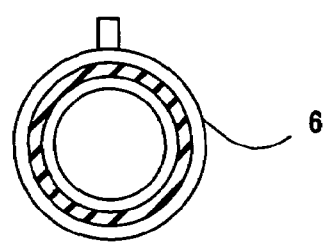
FIG. 2B is an end view of a heat insulation pipe, which is a baking object.

As shown in FIG. 2A, a heat insulation pipe used in this embodiment is similar to that in the first embodiment. A different point from the heat insulation pipe used in the first embodiment is that, an insulation flange 6 is used as a flange to seal end portions of two pipes. As shown in FIG. 2B, the insulation flange is an annular flange formed with inner and outer edge portions of metal and a middle portion of insulation material. Shapes and materials of insulation flange 6 are not limited, provided that the flange has a function of insulating pipes 1, 2. As an example, an insulation flange manufactured by Cosmotec co., ltd can be applied, which is commercially available as a vacuum airtight component. The inner and outer pipes electrically insulated with insulation flange 6 are then respectively connected to independent energization devices 5A and 5B.

With the baking device as described above, uniform baking of the whole heat insulation pipe is enabled by controlling currents of energization devices 5A, 5B so as to provide uniform temperatures of inner and outer pipes 1, 2.

Figure 2C:
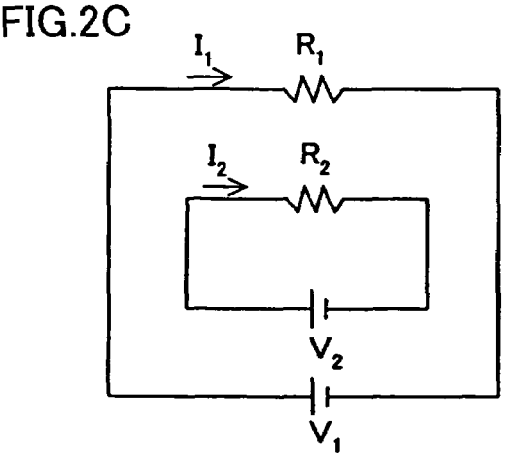
FIG. 2C is an equivalent circuit diagram of a device used in the method of the present invention.
Figure 2D:
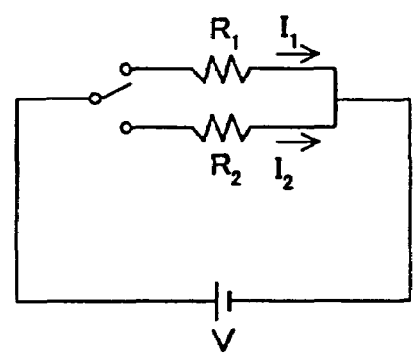
FIG. 2D is an equivalent circuit diagram of a variation of the device used in the method of the present invention.

It is to be noted that, though two energization devices are used in the baking device shown in FIGS. 2A and 2C, it may also be constructed such that, as shown in an equivalent circuit diagram of FIG. 2D, one energization device is used to heat the inner and outer pipes by switching of a connection object between the pipes.

As described above, the following effects are achieved with the baking method of the present invention.

(1) Energy-efficient baking can be performed by making a baking object itself a heat production element, in place of using a configuration of conducting heat of a heat production element to a baking object.

(2) It is unnecessary to prepare a dedicated heater or a heating gas device, piping and the like for baking, which enables simplification and size reduction of a baking device.

(3) A whole object can be heated uniformly by energizing the baking object for heating. In particular, even a long or large object such as a heat insulation pipe for a superconducting cable can be uniformly heated as a whole. Moreover, uniform heating is enabled by optimizing a design (cross-sectional area, thickness or material) of the object.

(4) A desired baking condition of a designer can be easily obtained by electrically insulating a plurality of regions of a baking object from each other and independently energizing each region to enable heating suitable for a characteristic of each region.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baking method for heating an object having a vacuum layer formed therein to remove gas molecules occluded in said object; characterized in that said object itself is made to be a heat production element for heating.

2. The baking method according to claim 1, characterized in that said object is made of conductive metal and said object is energized for heat production.

3. The baking method according to claim 2, characterized in that said object is formed with a plurality of members, and the members are electrically insulated from each other and each member is independently energized so that the object produces heat substantially uniformly.

4. The baking method according to claim 3, characterized in that the plurality of members forming said object are an inner pipe and an outer pipe, and the inner pipe and outer pipe are electrically insulated from each other with an insulation flange located between the pipes.

5. The baking method according to claim 2, characterized in that said object is a heat insulation pipe of a superconducting cable.

* * * * *

UNITED STATES PATENT AND TRADEMARK OFFICE
CERTIFICATE OF CORRECTION

| | |
|---|---|
| PATENT NO. | : 7,002,116 B2 |
| APPLICATION NO. | : 10/852163 |
| DATED | : February 21, 2006 |
| INVENTOR(S) | : Michihiko Watanabe et al. |

It is certified that error appears in the above-identified patent and that said Letters Patent is hereby corrected as shown below:

On the Title page, item (73), the city of the first Assignee should be:

Sumitomo Electric Industries, Ltd., Osaka (JP)

Signed and Sealed this

Twenty-sixth Day of December, 2006

JON W. DUDAS
*Director of the United States Patent and Trademark Office*